(12) United States Patent
Nakata

(10) Patent No.: US 9,086,829 B2
(45) Date of Patent: *Jul. 21, 2015

(54) INSTALLATION METHOD, INFORMATION PROCESSING APPARATUS AND DEVICE DRIVER

(71) Applicant: CANON KABUSHIKI KAISHA, Tokyo (JP)

(72) Inventor: Hiroaki Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 13/672,244

(22) Filed: Nov. 8, 2012

(65) Prior Publication Data

US 2013/0067462 A1 Mar. 14, 2013

Related U.S. Application Data

(62) Division of application No. 11/578,667, filed on Oct. 17, 2006, now Pat. No. 8,332,837.

(30) Foreign Application Priority Data

May 24, 2004 (JP) ................................. 2004-153469

(51) Int. Cl.
*G06F 9/44* (2006.01)
*G06F 3/12* (2006.01)
*G06F 9/445* (2006.01)

(52) U.S. Cl.
CPC ............ *G06F 3/1225* (2013.01); *G06F 9/4411* (2013.01); *G06F 9/44505* (2013.01)

(58) Field of Classification Search
USPC ................ 717/173–178, 121; 358/1.13, 1.15; 709/218, 221, 219, 223; 726/1; 714/819; 707/691; 713/1; 710/10
IPC ...................................................... G06F 3/1225
See application file for complete search history.

(56) References Cited

U.S. PATENT DOCUMENTS

| 5,675,831 | A | * | 10/1997 | Caputo ........................... 710/10 |
| 5,699,495 | A | | 12/1997 | Snipp |
| 6,405,309 | B1 | * | 6/2002 | Cheng et al. ...................... 713/1 |
| 6,724,402 | B1 | | 4/2004 | Baquero |
| 6,836,794 | B1 | | 12/2004 | Lucovsky et al. |

(Continued)

FOREIGN PATENT DOCUMENTS

| JP | 2001-075758 A | 3/2001 |
| JP | 2001-312453 A | 11/2001 |

(Continued)

*Primary Examiner* — Tuan Vu
(74) *Attorney, Agent, or Firm* — Fitzpatrick, Cella Harper & Scinto

(57) ABSTRACT

In response to a request from a client for the download installation of a device driver, device informational data that has been registered in a server and an installation set, which also has been registered in the server and includes the device driver and applications related to the device driver, are downloaded from the server to the client. On the basis of the device information data that has been downloaded from the server, the device driver and the related applications are installed in the client. After installation, post-installation processing regarding the applications related to the installed device driver is executed at the client based upon the device informational data.

12 Claims, 9 Drawing Sheets

(56) References Cited

U.S. PATENT DOCUMENTS

| | | |
|---|---|---|
| 7,028,019 B2 | 4/2006 | McMillan et al. |
| 7,055,150 B2 | 5/2006 | Terada et al. |
| 7,073,172 B2 | 7/2006 | Chamberlain |
| 7,284,044 B2 | 10/2007 | Teraoaka et al. |
| 7,305,456 B2 * | 12/2007 | Kobayashi .................... 709/218 |
| 7,430,736 B2 | 9/2008 | Nguyen et al. |
| 7,546,597 B2 | 6/2009 | Suzuki |
| 7,715,027 B2 * | 5/2010 | Ferlitsch ...................... 358/1.13 |
| 2002/0095501 A1 | 7/2002 | Chiloyan et al. |
| 2003/0120624 A1 | 6/2003 | Poppenga et al. |
| 2003/0200427 A1 | 10/2003 | Kemp et al. |
| 2003/0217192 A1 | 11/2003 | White et al. |
| 2005/0068558 A1 * | 3/2005 | Wang et al. .................. 358/1.13 |
| 2006/0174243 A1 | 8/2006 | Brewer et al. |

FOREIGN PATENT DOCUMENTS

| | | |
|---|---|---|
| JP | 2002-288110 A | 10/2002 |
| JP | 2003-288210 A | 10/2003 |
| JP | 2004-005224 A | 1/2004 |
| JP | 2004-005608 A | 1/2004 |

* cited by examiner

FIG. 6

```xml
<?xml version="1.0" encoding="shift-JIS"?>
<InstallationMethod
xmlns=http://schemas.eanon.com/PrinterDriver/InstallationMethod>
  <Program>
    <Registry>
      <Key>HKLM¥..</Key>
      <Value type="string">Ganon Printer Uninstaller</Value>
    </Registry>
    <ShortCutIcon>
      <IconSource>cnn014c32.ico</IconSource>
    </ShortCutIcon>
    <CopyFile>
      <SourcePath>cnuninst.exe</SourcePath>
      <Destination>..¥</Destination>
    </CopyFile>
    <CopyFile>
      <SourcePath>cnunin01.dll</SourcePath>
      <Destination>..¥</Destination>
    </CopyFile>
    <PopupUI>
      <Button>CB_OK</Button>
      <Caption>Installation completed</Caotion>
    </PopupUI>
  </Program>
</InstallationMethod>
```

INSTALLATION METHOD, INFORMATION PROCESSING APPARATUS AND DEVICE DRIVER

This application is a continuation of application Ser. No. 11/578,667, filed Oct. 17, 2006 (allowed), the contents of which are incorporated by reference herein.

TECHNICAL FIELD

This invention relates to a technique for downloading a device driver from a server to a client apparatus and installing the device driver.

BACKGROUND ART

A technique referred to as "download installation" has been developed in recent years. According to this technique, a device driver that has already been installed in a server is downloaded from a computer functioning as the server to a computer serving as a client connected via a network, the device driver is installed in the client computer and can be utilized thereby.

Consider a printer driver as an example of a device driver from among the various types of device drivers available. "Point & Print" in Microsoft's Windows (registered trademark) operating system is well known as one example of such a device driver.

For example, assume that a user who is a client specifies point & print. If the print server is of the Windows (registered trademark) 2000 family, the client creates a "true connect" printer connection of a Remote Procedure Call (RPC) at the time of point & print. When the RPC connection is created, a printer driver and printer settings are downloaded from the print server to the client. Furthermore, the client accepts an update program from the print server automatically. If the printer driver and settings are updated, the client accepts the settings asynchronously and executes print processing using the driver.

Configuration information that is downloaded together with the printer driver includes installable options and settings related to specific job processing functions, etc. For the purpose of assisting various functions of the printer driver, often related applications, namely a status monitor and an uninstaller, which are associated with the printer driver are downloaded simultaneously and utilized.

After the printer driver is installed automatically, these downloaded related applications are installed by the user employing a special-purpose program for installation purposes having a name such as "setup.exe".

In a so-called "download installation" environment, inclusive of point & click, that employs the functions of an operating system, it is possible for a desired printer driver installed beforehand in the server to be transferred to and copied on the client side. However, processing for installing an application related to a print driver, which is executed after installation of the print driver, cannot be controlled freely.

Further, post-installation processing that is optimum for a client cannot be executed after the device driver has been installed.

DISCLOSURE OF INVENTION

Accordingly, an object of the present invention is to freely control prescribed post-installation processing, which is associated with an installed device driver, based upon device informational data.

According to the present invention, the foregoing object is attained by providing an installation method for downloading a device driver from a server to a client and installing the device driver, comprising:

a step of downloading device informational data, which has been registered in the server, and an installation set, which includes the device driver and which has been registered in the server, to the client in response to a device-driver download installation request from the client;

a step of installing the device driver based upon the device informational data that has been downloaded from the server; and a step of executing prescribed post-installation processing, which is associated with the installed device driver, based upon the device informational data after the installation of the device driver.

Further, in accordance with an embodiment of the present invention, there is provided an installation method in a server for download installation of a device driver to a client, comprising:

a step of downloading device informational data that has been registered and an installation set, which includes the device driver and which has been registered, to the client in response to a device-driver download installation request from the client;

a step of displaying a user interface screen and generating instructional information for causing the client to execute post-installation processing associated with the device driver; and a step of registering the instructional information, which is for executing the post-installation processing, generated at the instructional information generating step, in the installation set as installation-method data.

Further, in accordance with an embodiment of the present invention, there is provided an installation method in a client for requesting a server for download installation of a device driver and installing the device driver that has been downloaded from the server, comprising:

a step of downloading device informational data, which has been registered in the server, and an installation set, which includes the device driver and which has been registered in the server, from the server in response to a device-driver download installation request;

a step of installing the device driver based upon the device informational data that has been downloaded; and a step of executing prescribed post-installation processing, which is associated with the installed device driver, based upon the device informational data after the installation of the device driver.

Further, in accordance with an embodiment of the present invention, there is provided an information processing apparatus serving as a server for performing download installation of a device driver to a client, the apparatus comprising:

storing means for storing device informational data and an installation set that includes the device driver;

means responsive of a device-driver download installation request from the client for performing download installation of the stored device informational data and installation set, which includes the device driver, to the client; and registration means for displaying a user interface screen, generating instructional information for causing the client to execute post-installation processing and storing the generated instructional information, which is for causing execution of the post-installation processing, in the installation set as installation-method data.

Further, in accordance with an embodiment of the present invention, there is provided an information processing apparatus for requesting a server for download installation of a device driver and installing the device driver that has been downloaded from the server, the apparatus comprising:

means for downloading device informational data, which has been registered in the server, and an installation set, which includes the device driver and which has been registered in the server, from the server in response to a device-driver download installation request;

means for installing the device driver based upon the device informational data that has been downloaded; and control mans for exercising control so as to execute prescribed post-installation processing, which is associated with the installed device driver, based upon the device informational data after the installation of the device driver.

Further, in accordance with an embodiment of the present invention, there is provided a device driver, which is installed in the client by the installation method mentioned above, for executing prescribed post-installation processing that is associated with the device driver, comprising:

reading in installation-method data for executing the post-installation processing; and executing the post-installation processing based upon the installation-method data.

In accordance with the present invention, prescribed post-installation processing associated with an installed device driver can be controlled freely based upon device informational data.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 6 is a diagram illustrating a specific example of installation-method data in this embodiment;

BEST MODE FOR CARRYING OUT THE INVENTION

A preferred embodiment of the present invention will now be described in detail with reference to the drawings.

Figure 1:
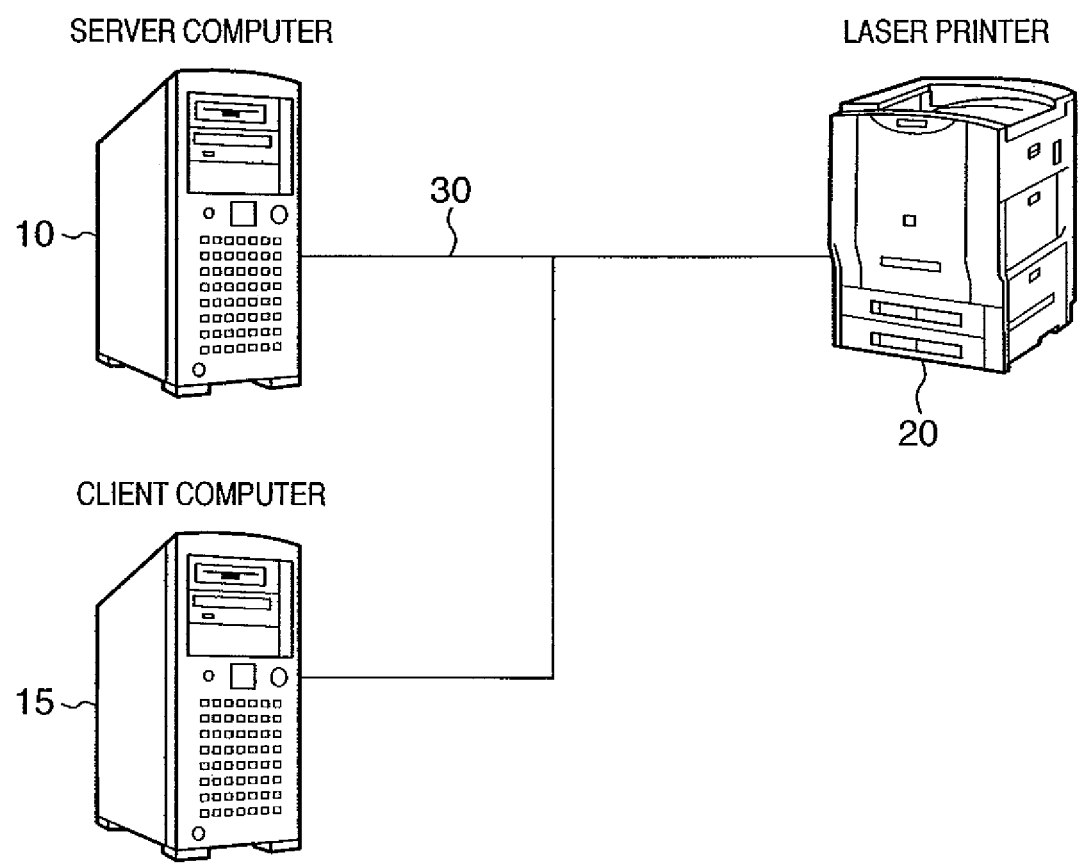
FIG. 1 is a diagram illustrating the configuration of a printing system according to an embodiment of the present invention.

FIG. 1 is a diagram illustrating the configuration of a printing system according to this embodiment. As shown in FIG. 1, the printing system is constituted by a server computer 10, a client computer 15 and a laser printer 20 that are connected to a network 30 such as Ethernet (registered trademark). Operating systems have been incorporated in respective ones of the server computer 10 and client computer 15, and so-called "download installation", inclusive of point & print, using the functions of the operating systems can be implemented.

By virtue of this download installation, printing can be performed by the laser printer 20 without the user of the client computer 15 manually installing a new printer driver.

In the example illustrated in FIG. 1, only one client computer 15 and only one laser printer 20 are connected to the network 30. However, it goes without saying that the number connected is not limited and it is permissible to connect a plurality of clients and a plurality of laser printers or a plurality of digital copiers or a plurality of facsimile machines.

Figure 2:
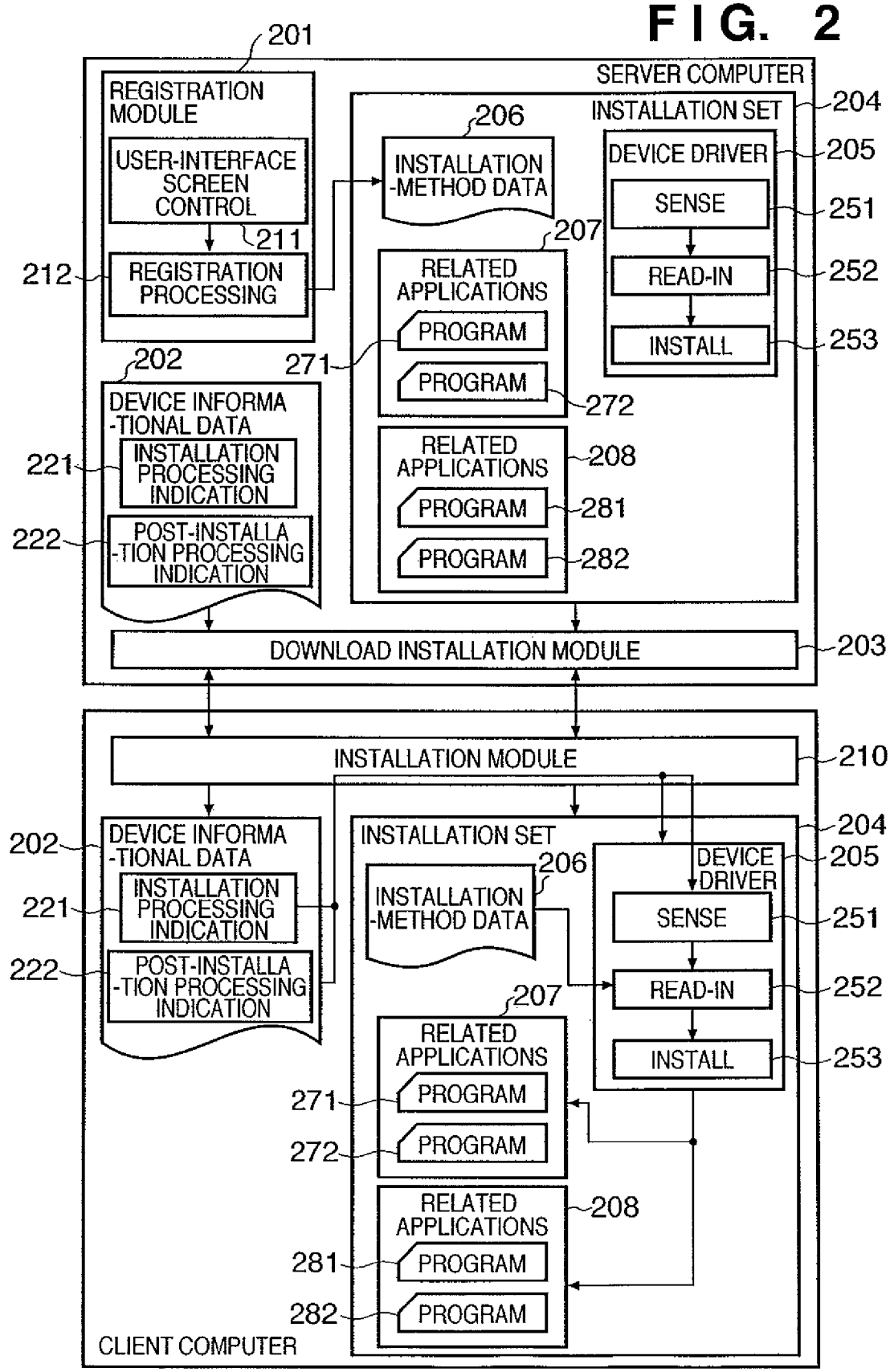
FIG. 2 is a diagram illustrating the modular structures of a server computer and client computer.

Next, reference will be had to FIG. 2 to describe the modular structures and operation of the server computer 10 and client computer 15. It should be noted that the hardware implementations of these computers are similar to that of an ordinary computer and need not be described here. Further, it is assumed that the operating systems that have been installed in the server computer 10 and client computer 15 are Microsoft's Windows (registered trademark) Server 2000 or later and Windows (registered trademark) 2000 or later, respectively.

FIG. 2 is a diagram illustrating the modular structures of the server computer and client computer. The server computer shown in FIG. 2 has a registration module 201. The registration module 201 designates a plurality of related applications 207, 208 relating to a device driver 205 that has already been installed in the server computer, and executes processing for registering an installation method that describes a method of installing the plurality of related applications 207, 208.

The registration module 201 includes a user-interface screen control module 211 for displaying a user interface screen on the display of the server computer 10 and generating installation-method data 206 for installing the plurality of related applications 207, 208, the details of which will be described later; and a registration processing module 212 registers the generated installation-method data 206 in a file format as an installation set 204 (described later) in a memory such a hard disk together with the device driver 205.

The installation set 204 is a set of program files and data files that include the device driver 205 of a device controlled by the server computer 10, the installation-method data 206 and the plurality of related applications 207, 208.

In addition to the functions of the device driver itself, such as the generation of data transmitted to a device, the device driver 205 also has a function 251, which is for sensing a request to execute processing (referred to as "post-installation processing" below) that is executed based upon the installation-method data 206 following the installation of the plurality of related programs 207, 208 relating to the device driver 205, a read function 252 and an installation function 253, etc.

The installation-method data 206 is a data file read in by the read function 252 and includes information that specifies installation methods related to respective ones of the plurality of related applications 207, 208.

The plurality of related applications 207, 208 are sets of files that include programs 271, 272 and programs 281, 282, respectively. The device driver 205 is assisted by installing these applications. If the device driver 205 is a printer driver, then an uninstaller program for uninstalling this printer driver and a status monitor program can be mentioned as specific examples of these applications.

Further, it is assumed that in a case where there are a plurality of devices controlled by the server computer 10, the device driver 205 of the installation set 204 and device informational data 202, described below, are prepared beforehand on a per-device basis.

The device informational data 202 includes an installation processing indication 221, which is information necessary for installing the device driver 205, and a post-installation processing indication 222, which is necessary for post-installation processing that follows the installation of the device driver 205 and related applications 207, 208.

Further, it goes without saying that in a case where a corresponding device driver has been updated, the installation processing indication 221 and post-installation processing indication 222 of the device informational data 202 are rewritten. The installation set in which the device driver of the updated version has been incorporated and the device informational data are downloaded to and installed in the client computer 15.

A download installation module 203 accepts a download installation request from the client computer 15. If the model name of a device has been designated, the module 203 downloads and installs the device informational data of the designated model name from a plurality of installation sets and as well as the installation set that corresponds to this device informational data. It may be so arranged that if a device has not been designated, then the download installation module 203 downloads all installation sets and device informational data and the client computer 15 is allowed to select the device informational data and installation set based upon the model name of the device.

Figure 3:
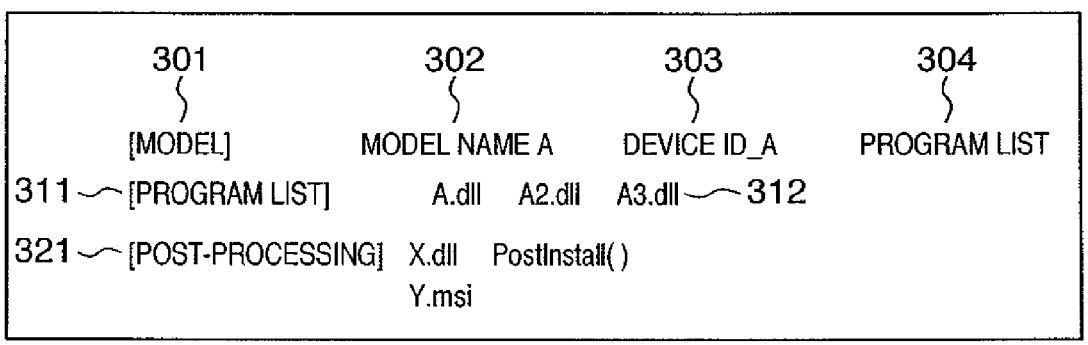
FIG. 3 is a diagram illustrating an example of description of device informational data in this embodiment.

Described next will be a specific method of describing the device informational data 202 that is downloaded from the server computer 10 to the client computer 15. The brackets shown in FIG. 3 enclose sections. As illustrated in FIG. 3, a model section 301 is a section for specifying a model name 302 of a printer corresponding to a printer driver that will be downloaded and installed as well as a device ID 303 corresponding to this model name. In this example, the device is a printer, the model name 302 of which is "MODEL NAME A", specified by the device ID 303, which is "DEVICE ID_A". A character string "PROGRAM LIST" is described in a program list 304.

The next section is a program list section 311. If a character string has been described in the program list 304 of model section 301, then the program list section 311 reads out driver modules that are listed at 312 and installs these modules as a driver set. In this example, a group of programs A.dll, A2.dll, A3.dll has been listed as the driver set.

The next section is a post-processing section 321. This section describes a program that is called for the purpose of post-processing as well as which function of the program is to be called. In this example, the designation is such that a function "PostInstall( )" of driver module X.dll is called as post-processing.

It should be noted that the model section 301 and program list section 311 described above correspond to the device informational data 202 and installation processing indication 221, and that the post-processing section 321 corresponds to the post-installation processing indication 222 of the device informational data 202.

Further, the second row of the post-processing section 321 describes that post-installation processing is executed upon launching a driver-set program "Y.msi". The package (Y.msi) file includes a database that stores all instructions and data necessary in order to install and uninstall programs in a variety of installation scenarios.

For example, if an earlier version of a plug-in module or application utilized by the printer driver has already been installed, then an indication to install this plug-in module or application can be inserted into the package file as script. Further, if a plug-in module or application does not exist on the client side, then an indication to install this plug-in module or application from a prescribed server can also be described and inserted into the package file as script.

Thus, the Y.msi package file is obtained by combining installation script and a group of programs. By describing the msi file in the post-processing section 321 and executing the installation set, it is possible to call another installation set as post-processing.

With reference again to FIG. 2, the operating system of the client computer 15 is the same as that of the server computer 10, as mentioned above, or has compatibility with regard to the download installation function. Compatibility with regard to the download installation function refers to the fact that an installation module 210 of the client computer 15 has the ability to download and install the installation set 204 and device informational data 202 by cooperating with the download installation module 203 of the server computer 10.

The installation module 210 in the client computer 15 will be described later in greater detail.

Described next will be processing whereby the registration module 201 of the server computer 10 registers the data of the installation method in the installation set 204. Here the data of the installation method is registered by the registration processing module 212, described later, as the installation-method data 206 shown in FIG. 2.

Figure 4:
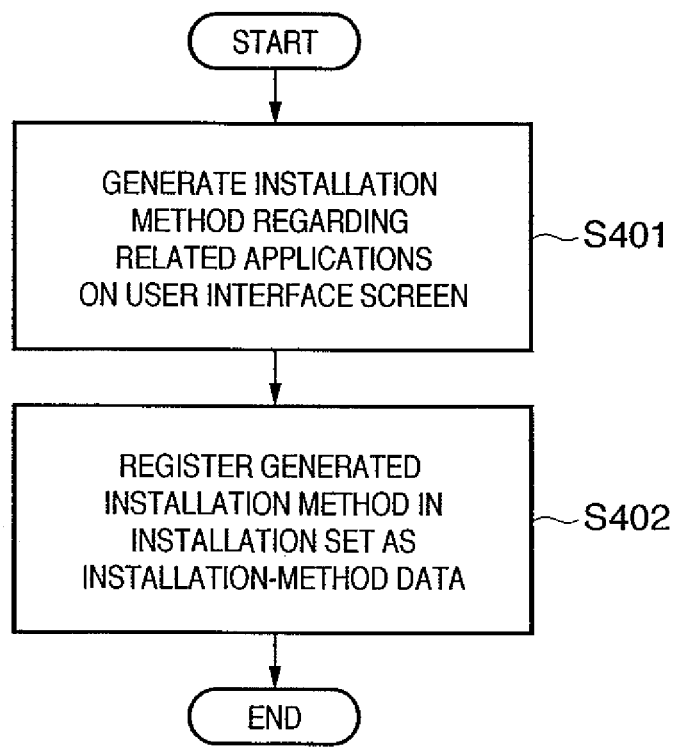
FIG. 4 is a flowchart illustrating processing for registering installation-method data according to this embodiment.

FIG. 4 is a flowchart illustrating processing for registering installation-method data in this embodiment. First, at step S401, the user who has started up the registration module 201 manipulates a user interface screen of the kind shown in FIG. 5 displayed on the display monitor by the user-interface screen control module 211, thereby generating data of a hierarchical installation method for every related application.

Specifically, information included as the installation method includes information 501 for adding on or changing registry information under management of the system; information 502 for registering a short-cut program icon of an associated application; information 503 for copying or moving a group of program files, which constitute the associated application, from a stipulated location to another location; and information 504 for displaying an installation-related message using a user interface. In case of the related applications 207, the information 501 to 504 is generated with respect to each of the programs 271, 272.

It should be noted that the user-interface screen control module 211 exercises screen control when the information 501 to 504 is added on, modified or deleted interactively by the user. The information 501 to 504 is stored in a RAM within the server computer 10.

Figure 5:
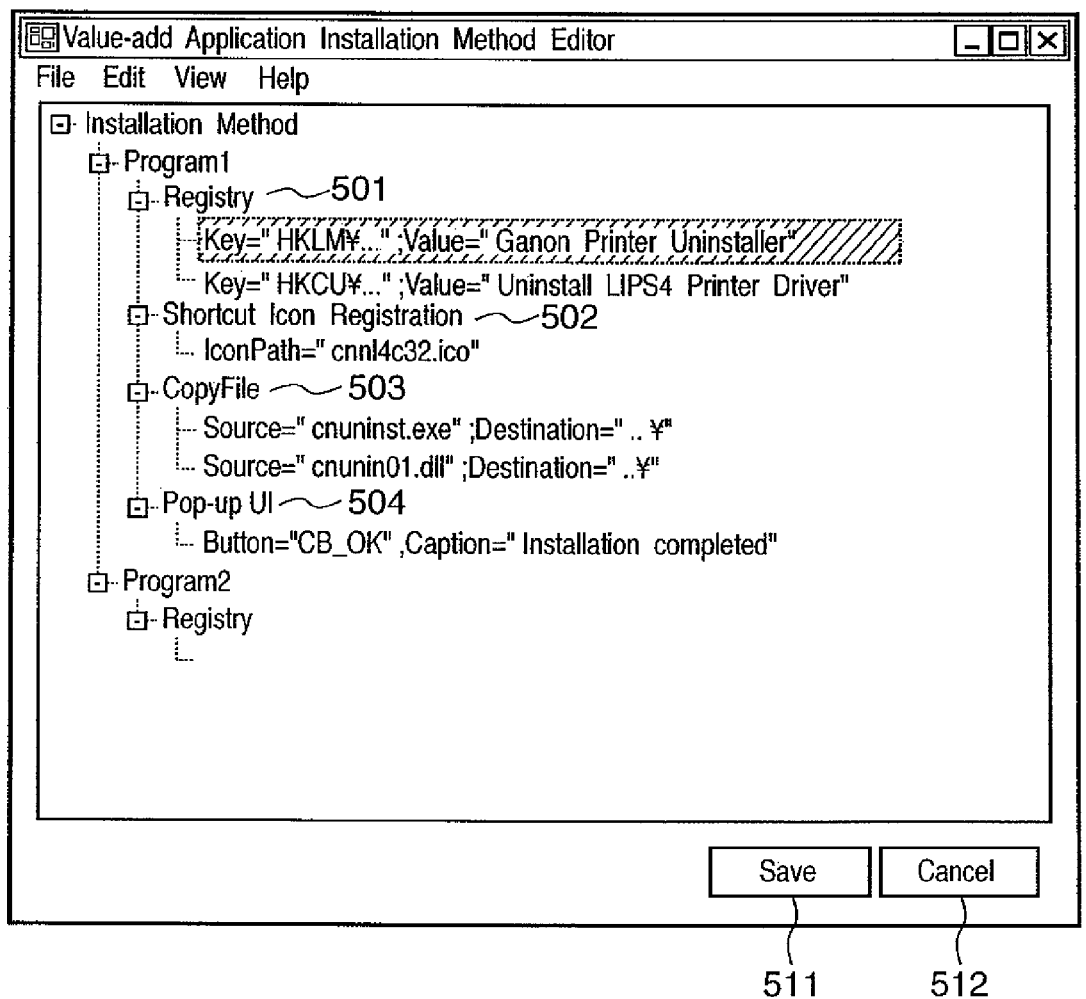
FIG. 5 is a diagram illustrating an example of a user interface screen according to this embodiment.

Next, in order to register the data of the installation method generated using the user interface screen at step S401, a Save button 511 shown in FIG. 5 is clicked by a pointing device such as a mouse at step S402, whereupon the registration processing module 212 registers the data of this installation method (referred to as the installation-method data 206 below) in the installation set 204 as a file. Further, if a Cancel button 502 is clicked, this processing is cancelled.

FIG. 6 is a diagram illustrating a specific example of the installation-method data of this embodiment. As shown in FIG. 6, the installation-method data 206 is characterized in that it has the format of a hierarchical document, such as XML, that is capable of being read in by the read function 252 of the device driver 205. The installation-method data 206 thus incorporated in the installation set 204 of the server computer 10 is downloaded to the client computer 15 by the download installation module 203.

On the other hand, the installation set 204 that has been downloaded by the installation module 210 of client computer 15 is copied as the installation set 204 of client computer 15 and the installation of the device driver 205 is carried out.

Download installation processing in the printing system of FIG. 1 will now be described. In this processing, the user of client computer 15 requests point & print, and the operating system of the client computer 15 installs a device driver and post-processing in the client computer 15 based upon installation set and device informational data that have been downloaded from the server computer 10.

Figure 7:
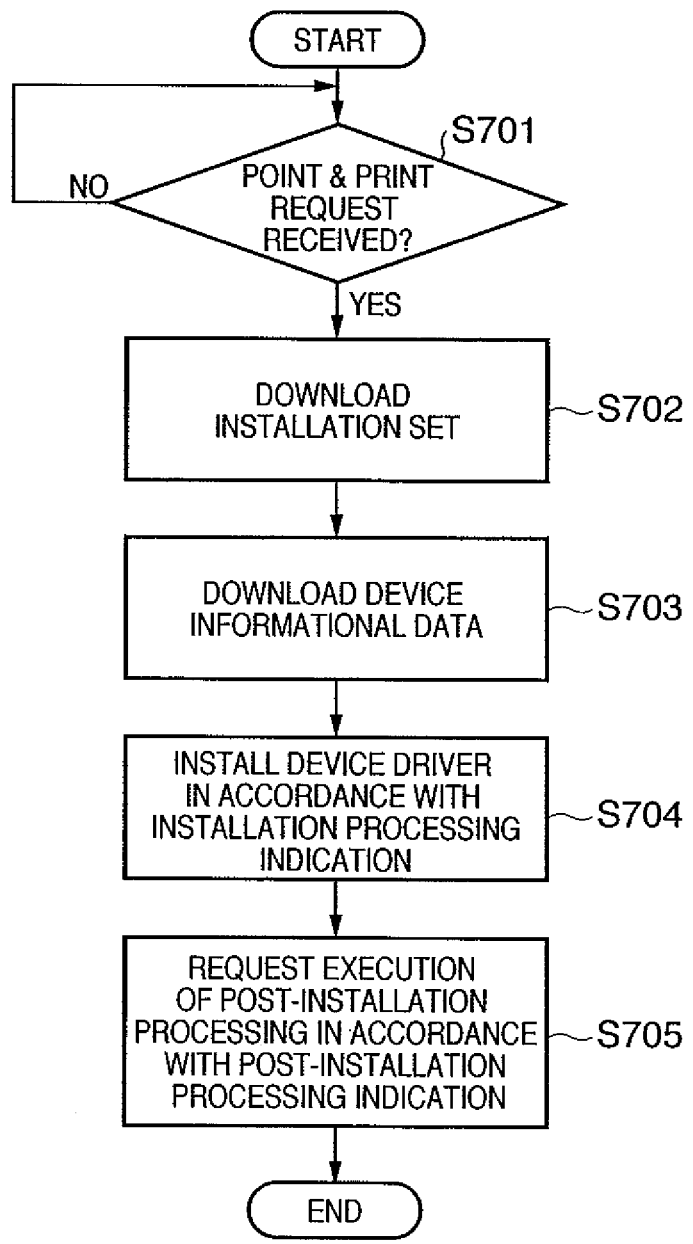
FIG. 7 is a flowchart illustrating download installation processing.

FIG. 7 is a flowchart illustrating download installation processing. First, at step S701, the installation module 210 requests the server computer 10 to start download installation upon accepting a point & print request issued by the user through a user interface (constituted by the monitor, keyboard and mouse of the client computer 15) or API (Application Program Interface).

Next, at step S702, in response to the download-installation start request from the client computer 15, the download installation module 203 of the server computer 10 downloads the installation set 204, which has been set for every device, to the installation module 210 of client computer 15. Next, at step S703, the download installation module 203 is used when a device driver has been installed in the server computer 10 and subsequently also downloads the device informational data 202 corresponding to the model, which was designated at the time of point & print, being held in an area managed by the operating system.

By way of example, if the client computer 15 has designated that the device driver of model A be installed, then the server computer 10 downloads the device informational data of model A to the client computer 15. Alternatively, all device informational data that has been prepared in advance may be downloaded from the server computer 10 and the necessary device informational data corresponding to the applicable model name may be read out based upon the model name designated.

Next, at step S704, the installation module 210 of the client computer 15 implements, by the functions of its operating system, the content described in the installation processing indication 221 of the device informational data that has been downloaded from the server computer 10 and installs the device driver and related applications of the downloaded installation set.

For instance, in the example shown in FIG. 3, if the model name for which installation has been designated is "MODEL NAME A", then the device informational data described as "MODEL NAME A" in the model name 302 of model section 301 is read out. The driver set (A.dl1, A2.dl1, A3.dl1) 312 described in the program list section 311 of model name A is installed in regular order.

Next, after installation of the above-mentioned device driver is completed, the content described in the post-installation processing indication 222, namely the post-processing section 321, is executed as post-installation processing by the functions of the operating system at step S705. This is as described above with reference to FIG. 3.

Described next will be device-driver-related prescribed post-installation processing executed by the device driver that has been installed in the client computer 15.

Figure 8:
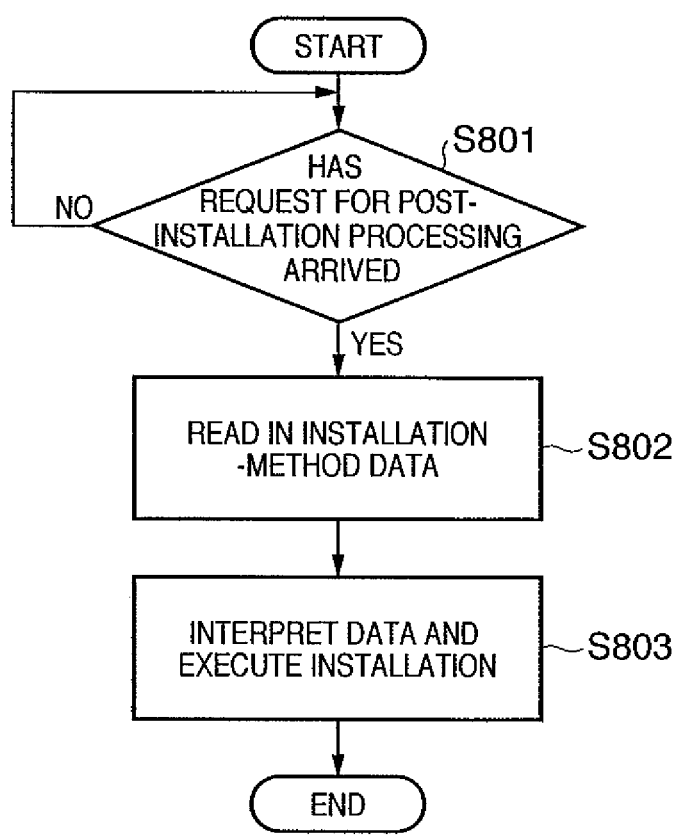
FIG. 8 is a flowchart illustrating post-installation processing by a device driver.

FIG. 8 is a flowchart illustrating post-installation processing executed by the device driver. First, at step S801, the device driver 205 that has been installed in the client computer 15 starts post-installation processing if the function of the driver module described in the post-installation processing indication 222 is read out by the operating system and a request to execute post-installation processing issued by the operating system is detected by the sensing function 251.

Next, at step S802, the device driver reads in the installation-method data 206 that the read function 252 has incorporated in the installation set 204 of the driver beforehand. Specifically, since the installation-method data 206 is an XML document that has been saved as a file, the device driver converts the data to tree-structured data in the computer memory using a read-in module such as an XML parsing module and stores this data in a storage area within the device driver 205.

At step S803, the device driver executes post-installation processing relating to the plurality of related applications 207, 208 associated with the driver based upon the installation-method data 206 read at step S802. Specifically, this post-installation processing is processing for registering designated registry information, registering a short-cut program icon, copying or moving program files that constitute the applications from a stipulated location to another location, and displaying a user interface such as a message box.

Figure 9:
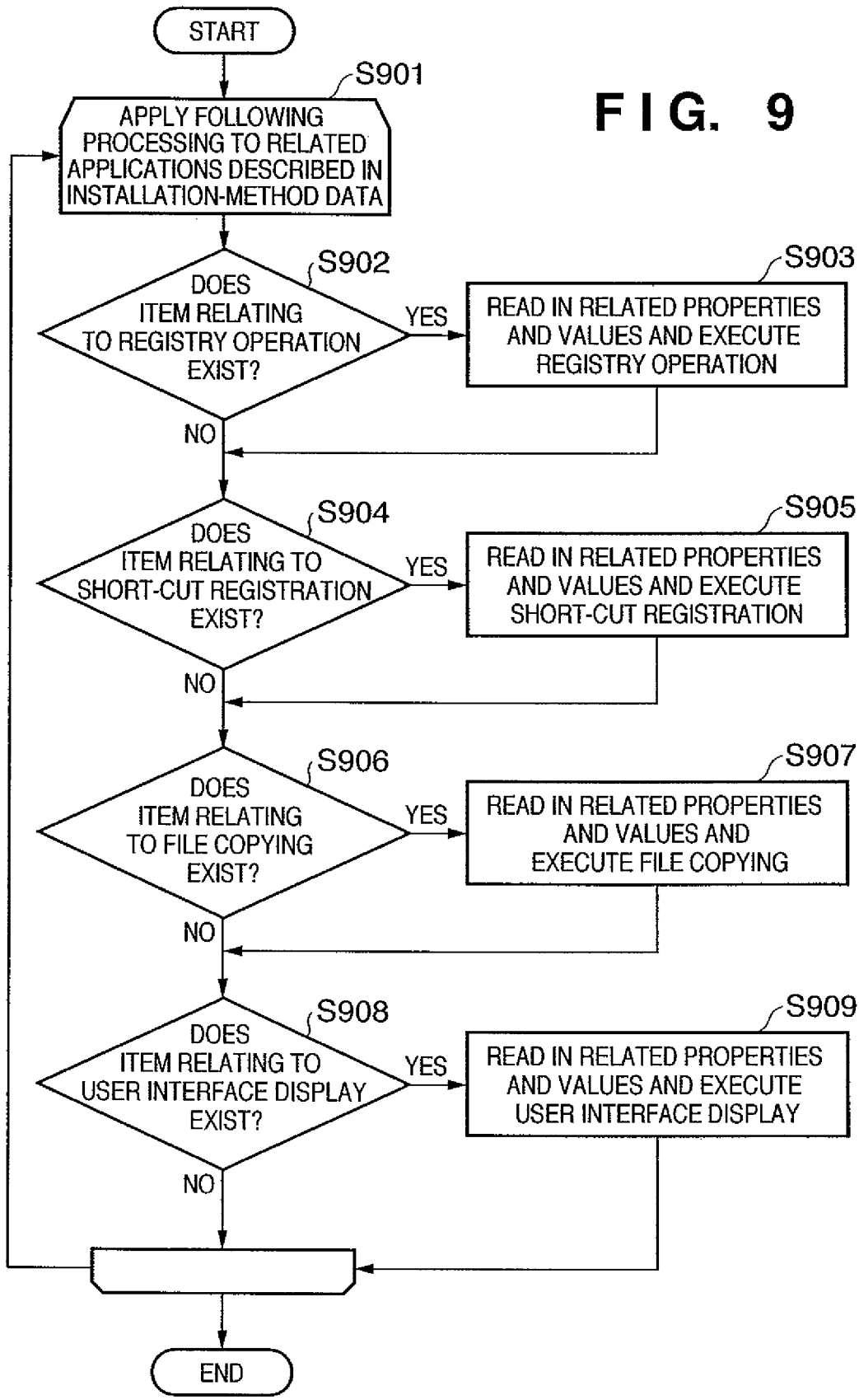
FIG. 9 is a flowchart illustrating the details of processing of a step S803 in FIG. 8.

FIG. 9 is a flowchart illustrating the details of processing of step S803 shown in FIG. 8. First, at step S901, the device driver lists up the plurality of related programs associated with the device driver included in the installation-method data that has been stored in the device driver as tree-structured data and applies the following steps S902 to S909 to each of these programs:

It is determined at step S902 whether an item relating to a registry operation exists in the installation-method data of the related applications. Control proceeds to step S903 if this item exists and to step S904 if the item does not exist. Properties and values relating to the registry operation are read in and the registry operation is executed at step S903 through an API or the like provided by the operating system. In the example depicted in FIG. 6, a value "HKLM¥ . . . " is described with respect to a property "Key" relating to a registry key, and character-string values "Canon Printer Uninstaller" are described with respect to a property "Value" relating to the registry key. The registry operation is executed, therefore, upon applying these items of information to the API.

If items relating to registration of a short-cut item, copy or movement of a program file and display of a user interface screen exist, the relevant processing is executed at steps S904 to S909 in a manner similar to that of the registry operation described above.

Thus, the device driver 205, without relying upon processing to which it itself has been programmed in advance, is capable of installing private items of a plurality of related applications based upon the installation-method data 206 that has been registered by the registration module 201.

It should be noted that initialization of a device driver is sensed by a spooler both in case of local installation of a printer driver and in case of download installation of the printer driver from a server computer to a client computer, and therefore it is possible for related applications to be installed simultaneously in the form of both local installation and download installation.

Thus, in accordance with this embodiment, as described above, first, applications related to a printer driver can be installed even in a download installation scheme such as point & print, and second, the application installation method can be changed with ease.

Further, in a computer network system having several hundred client computers, for example, applications related to a device driver can be installed at the same time as download installation of the device driver without special-purpose programs for installation purposes being executed by each and every client computer.

Further, even in a case where a special application that is not usually included in the installation set of a device driver distributed to certain specific customers is incorporated in associated fashion, a program for installing this application is not actually created but is added to installation-method data by a registration module, thereby making it possible to embed desired processing in a device driver in simple fashion.

Furthermore, related applications can be installed without launching a special-purpose program for installation purposes, even in a configuration where download installation is from a server to a client, as in the manner of point & print.

Furthermore, since a special-purpose program, such as "setup.exe", for installation purposes is assembly code generated as by compiling source code programmed in advance, installation can be performed only by a method programmed in advance. In order to change the installation method, therefore, it is necessary change the source code of the device driver and generate new assembly code by performing compiling again. With this embodiment of the invention, however, there is absolutely no need to perform such a troublesome operation.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes read from the recording medium implement the novel functions of the embodiment and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-153469 filed on May 24, 2004, the entire contents of which are hereby incorporated by reference herein.

The invention claimed is:

1. A client apparatus which communicates with a first server and a second server, wherein a device driver for a printer managed by the first server has been installed in the first server, wherein the second server stores an application related to the device driver, wherein the first server manages first information on the device driver and second information used for installation of the application related to the device driver and corresponding to a model of the managed printer, and wherein the first server comprises an operating system that provides the client apparatus with an installation function to install the device driver, wherein a client operating system of the client apparatus is provided by the same vendor as the operating system that the first server comprises, the client apparatus comprising at least a processor, functioning as:

a request unit configured to send to the first server a request including designation information which designates a desired printer;

a receiving unit configured to receive a response according to the request from the first server, wherein the response includes the device driver, the first information and the second information, and wherein the device driver, first information and second information correspond to the designation information; and an installation unit configured to install, by using a function of the client operating system of the client apparatus, the device driver for the desired printer according to the response, wherein the application related to the device driver is downloaded from the second server if the application does not exist on the client apparatus, and the application is installed, by using the function of the client operating system of the client apparatus, as a post-installation processing of the device driver based on the second information included in the received response.

2. The client apparatus according to claim 1, wherein the second information is based on a registration process pre-established at the first server, and wherein the application is based on a registration process pre-established at the second server.

3. The client apparatus according to claim 1, wherein the application is a program executed by the client apparatus separately from the device driver.

4. The client apparatus according to claim 1, wherein the application is a status monitor program.

5. A method of controlling a client apparatus which communicates with a first server and a second server, wherein a device driver for a printer managed by the first server has been installed in the first server, wherein the second server stores an application related to the device driver, wherein the first server manages first information on the device driver and second information used for installation of the application related to the device driver and corresponding to a model of the managed printer, and wherein the first server comprises an operating system that provides the client apparatus with an installation function to install the device driver, wherein a client operating system of the client apparatus is provided by the same vendor as the operating system that the first server comprises, the client apparatus comprising at least a processor, the method comprising the steps of:

sending to the first server a request including designation information which designates a desired printer;

receiving a response according to the request from the first server, wherein the response includes the device driver, the first information and the second information, and wherein the device driver, first information and second information correspond to the designation information; and installing, by using a function of the client operating system of the client apparatus, the device driver for the desired printer according to the response, wherein the application related to the device driver is downloaded from the second server if the application does not exist on the client apparatus, and the application is installed, by using the function of the client operating system of the client apparatus, as a post-installation processing of the device driver based on the second information included in the received response.

6. The method according to claim 5, wherein the second information is based on a registration process pre-established at the first server, and wherein the application is based on a registration process pre-established at the second server.

7. The method according to claim 5, wherein the application is a program executed by the client apparatus separately from the device driver.

8. The method according to claim 5, wherein the application is a status monitor program.

9. A non-transitory computer-readable medium storing a program for causing a client apparatus to perform a method of controlling the client apparatus which communicates with a first server and a second server, wherein a device driver for a printer managed by the first server has been installed in the first server, wherein the second server stores an application related to the device driver, wherein the first server manages first information on the device driver and second information used for installation of the application related to the device driver and corresponding to a model of the managed printer, and wherein the first server comprises an operating system that provides the client apparatus with an installation function to install the device driver, wherein a client operating system of the client apparatus is provided by the same vendor as the operating system that the first server comprises, the client apparatus comprising at least a processor, the method comprising the steps of:

sending to the first server a request including designation information which designates a desired printer;

receiving a response according to the request from the first server, wherein the response includes the device driver, the first information and second information, and wherein the device driver, first information and second information correspond to the designation information; and installing, by using a function of the client operating system of the client apparatus, the device driver for the desired printer according to the response, wherein the application related to the device driver is downloaded from the second server if the application does not exist on the client apparatus, and the application is installed, by using the function of the client operating system of the client apparatus, as a post-installation processing of the device driver based on the second information included in the received response.

10. The non-transitory computer-readable medium according to claim 9, wherein the second information is based on a registration process pre-established at the first server, and wherein the application is based on a registration process pre-established at the second server.

11. The non-transitory computer-readable medium according to claim 9, wherein the application is a program executed by the client apparatus separately from the device driver.

12. The non-transitory computer-readable medium according to claim 9, wherein the application is a status monitor program.

* * * * *